Feb. 14, 1928.
W. WALLACE
1,659,286
CENTRIFUGAL FRICTION CLUTCH
Filed April 8, 1925    2 Sheets-Sheet 1
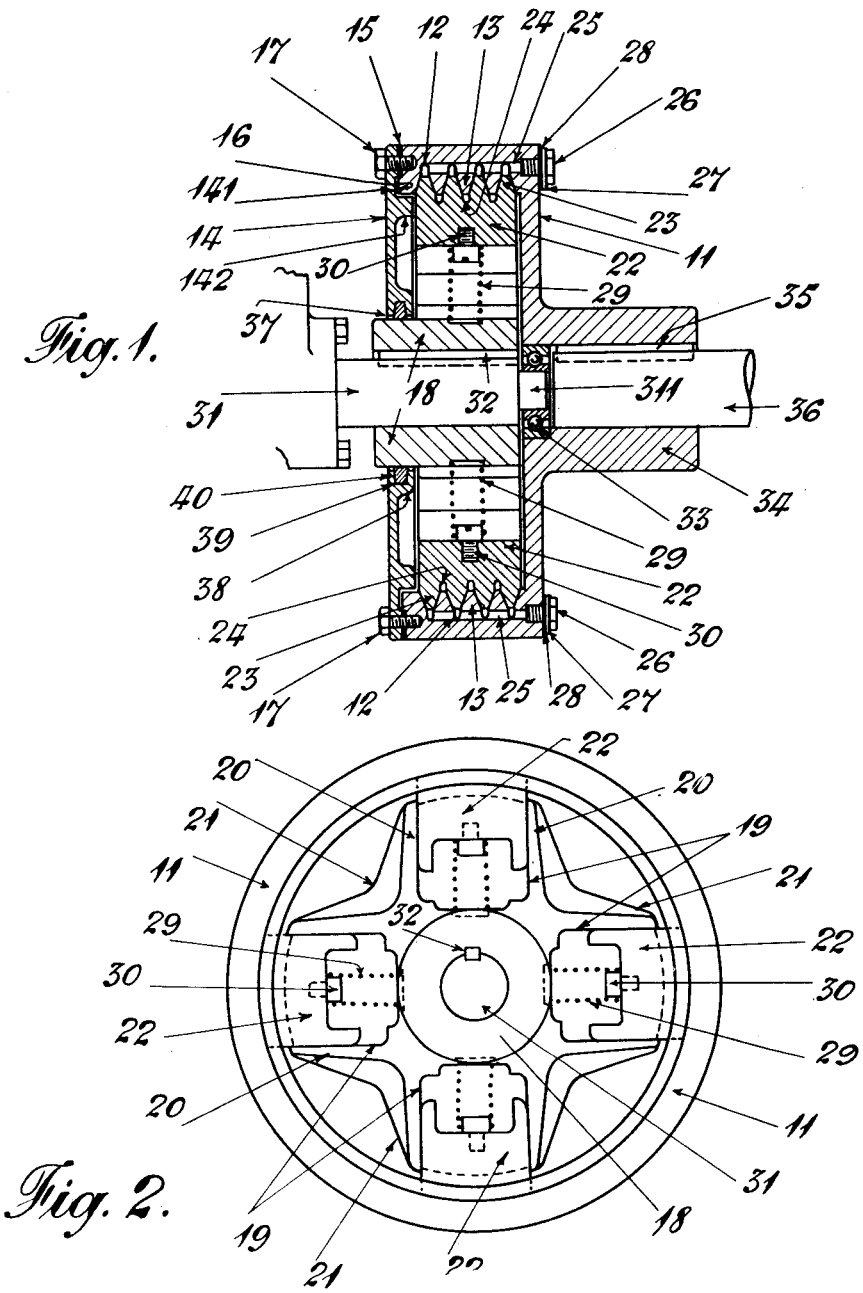
INVENTOR:
William Wallace
BY HIS ATTORNEYS:—

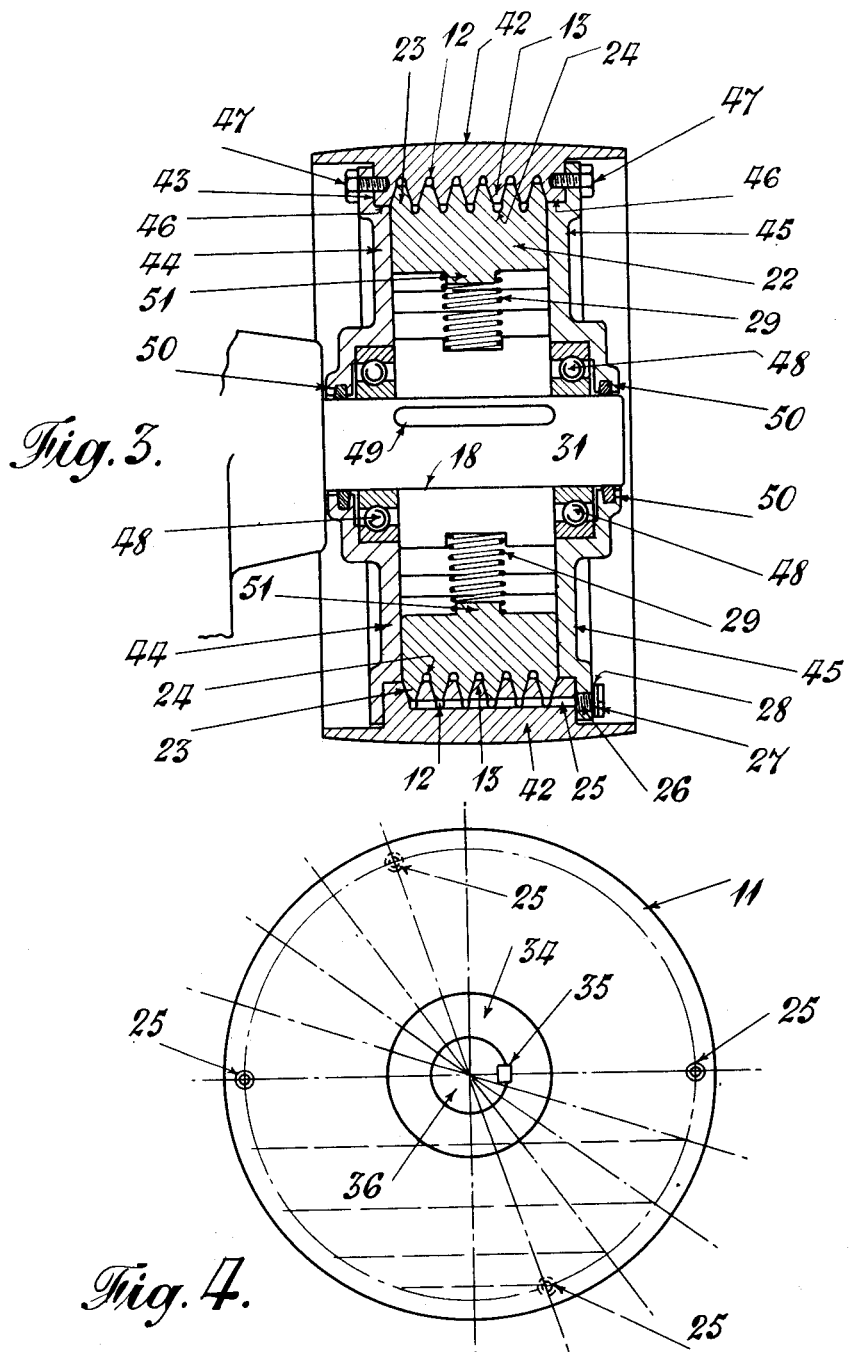

Patented Feb. 14, 1928.

1,659,286

UNITED STATES PATENT OFFICE.

WILLIAM WALLACE, OF OLDHAM, ENGLAND; AGNES WALLACE AND HUGH AMHERST WALLACE EXECUTORS OF SAID WILLIAM WALLACE, DECEASED.

CENTRIFUGAL FRICTION CLUTCH.

Application filed April 8, 1925, Serial No. 21,537, and in Great Britain April 14, 1924.

This invention of improvements in centrifugal friction clutches relates to centrifugal clutches for the transmission of motive power and of the kind in which driving members movable inwardly and outwardly relatively to the axes of revolution of the clutches and made to receive motion or load from driving parts and guided by them in inward and outward movement are moved outwardly solely by the centrifugal force due to their revolution into engagement with the driven members to be set in rotation and made to transmit motion or load from the clutches. The invention has for its object to provide a centrifugal friction clutch of the said kind which while more certain in engagement of the driving and driven members so as to obviate slipping in full engagement and consequent wear more completely than in centrifugal clutches hitherto provided and of compact construction and ensuring the proper lubrication of the driving and driven member or members during the passage of the driving member or members into engagement with the driven member, presents the especial advantage of provision for the easy supply and removal of lubricant from the interior of the clutch whereby it is made easy to adjust the speed at which the driving member or members shall cease to slip in the driven member in being brought into engagement therewith.

With this object the invention consists in a clutch which having the driven member shaped and constructed to retain lubricant when at rest and the inwardly and outwardly movable driving member or members guided and movable outwardly under the influence of its or their revolution in a revoluble driving device for the transmission of revolution to such driving member or members and having the driving and driven member conversely grooved and ridged in their outwardly and inwardly engaging parts and provided in the driven member with space into which oil may be driven from the engaging surfaces is also provided in said driven member with a passage parallel to its axis communicating with all the grooves of such driven member and with a filling opening furnished with a closing device and consequently presentable at different levels by the driven member being turned into different positions about the axis of the clutch.

In the accompanying drawings in which Figs. 1 and 2 and Fig. 3 show as examples centrifugal friction clutches constructed according to this invention and forming illustrative embodiments thereof and Fig. 4 in conjunction with Figs. 1 and 2 illustrates the means of adjusting the speed of engagement of a clutch by adjustment of the quantity of oil or other lubricant therein. Fig. 1 is a longitudinal section of a centrifugal friction clutch and Fig. 2 is a side elevation of the clutch seen from the left hand of Fig. 1 with the cover removed. Fig. 3 is a longitudinal section of a centrifugal friction clutch in the form of a pulley and Fig. 4 is a diagrammatic side elevation of a clutch.

The same numerals of reference indicate corresponding parts in the several figures.

In Figs. 1 and 2 the driven member 11 of the centrifugal clutch is formed as a circular casing with a series of internal circumferential grooves 12 and ridges 13 and is provided with a cover plate 14 applied to it with a packing 15 of paper interposed and having a circumferential rib 141 engaging a ridge 16 on the driven member 11 and secured by set screws 17. The cover plate 14 is formed with a circumferential ridge 142 adapted to fit within the driven member 11. A boss 18 to be mounted centrally within the driven member 11 is provided with slideways 19 formed between arms 20 strengthened by ribs or webs 21 and in the example shown there are four sets of arms 20 forming four slideways 19 at right angles extending radially and at equal distances apart around the boss 18 but any desired number may be provided. In each slideway 19 is fitted to be slidden a block 22 formed on the face outwards in use with a series of wedge shaped ridges 23 and grooves 24 corresponding with the grooves 12 and ridges 13 of the driven member 11. The blocks 22 form the driving members of the friction clutch.

Considered in the plane of the axis or centre line of the clutch, the ridges 13 and grooves 12 of the driven member 11 and the grooves 24 and ridges 23 of the blocks 22 are partly of triangular section and the bottoms of the grooves are made as channels of U section the channels of U section facilitating the formation of the inclined sides of the ridges and the grooves and allowing full engagement of the blocks 22 even after some wear. The grooves 12 of the driven member 11 are made a little deeper in the parts of triangular section than is necessary to allow the triangular parts of the ridges 23 of the blocks 22 to engage with the sides of the grooves 12. In the case of the grooves 12 the parts of U section besides facilitating formation and allowing full entry of the ridges 23 even after some wear serve as receptacles for oil or other lubricant for example soap solution or a mixture of such solution and oil. Any lubricant which will flow under the influence of gravity or centrifugal force may be used but for simplicity in the further description of this invention oil will be used generally as meaning oil or other lubricant.

Holes 25 are formed in the driven part 11 parallel to the axis of the clutch for the supply and withdrawal of oil and made to communicate with all the parts of U shaped section and are adapted to be closed by set screws or plugs 26 each provided with a metal washer 27 and a leather or like washer 28 to secure an oil tight joint. Between the blocks 22 and the boss 18 light springs 29 are interposed which prevent the blocks 22 from dropping too far inwardly in the clutch when the boss 18 is at rest. Each spring 29 is held in position by being made to enter a hole in the boss 18 and made to engage around a set screw 30 secured in the block 22 with which it co-operates. 31 is the driving shaft receiving motion in any suitable way. The boss 18 is held in driving connection with the shaft 31 by means of a key 32. At the end 311 the shaft 31 is made of smaller diameter and fits within a ball bearing 33 fitted into the driven member in order that the boss 18 and driven member may be kept in co-axial relation and that the boss 18 can be revolved freely without revolving the driven member 11 until the blocks 22 begin to engage with the driven member 11. The driven member 11 is formed with a boss 34 and is held in driving connection by means of a key 35 with a shaft 36 to be driven.

The cover plate 14 having an opening 37 which fits closely around the boss 18 is formed with a central boss 38 with a groove 39 formed in its inner circumference containing suitable packing material 40 serving to form an oil tight joint between the cover plate 14 and the boss 18.

When the clutch is mounted in position for use a suitable quantity of oil is introduced within the driven member 11. When the driving shaft 31 and driven member 11 are at rest the oil within the driven member will flow to the lower part of the interior. When the driving shaft 31 is set in motion the blocks 22 being revolved within the driven member 11 will be brought into the oil and will distribute it around the inner circumference of the driven member 11 thereby ensuring that when the speed of the driving shaft 31 becomes sufficient to cause the blocks 22 moved outwards by centrifugal force to engage by their ridges 23 and grooves 24 with the grooves 12 and ridges 13 of the driven member 11 they shall be able to slide smoothly around the driven member 11 while beginning to turn it until the speed of revolution of the driven member 11 is increased sufficiently and they are made fully to engage with the driven member 11 by centrifugal force and the driven member 11 and driving shaft 31 revolve together. When the driven member 11 is revolving with the driving shaft 31 the oil therein will be distributed around its circumference and according as more or less oil has been put into the driven member all the oil may pass later or sooner into the bottoms or U shaped parts of the grooves 12 in the driven member so that the blocks 22 and driven member 11 shall be fully in unlubricated contact. In either case as soon as the driving shaft 31 is stopped and the driven member 11 comes to rest the oil will collect again in the lower part ready to lubricate the blocks 22. As will be hereinafter further explained the provision of more or less oil determines whether the blocks of the driving member shall engage with the driven member at a higher or a lower proportion of the intended speed of revolution of the driven member.

In Fig. 3, a clutch with a driven member 11 formed as a pulley is illustrated which is essentially the same in internal construction and action as the clutch shown in Figs. 1 and 2. The driven member 11 in Fig. 3 is formed as a crowned pulley 42 and provided with rebates or shoulders 43 at each side so that its sides may be closed by cover plates or discs 44, 45 having corresponding rebates 46 and secured by set screws 47. The cover plates 44, 45 are mounted by means of ball bearings 48 so as to be loose upon the driving shaft 31 on which the boss 18 of the driving member is secured by a key 49 and are made closely to surround the shaft 31 and furnished with packings 50 to make oil tight joints with it. Fig. 3 shows only one oil hole 25 but two or more may be provided as in the clutch shown in Figs. 1 and 2. In Fig. 3 the blocks 22 are formed with projections 51 for holding the springs 29 in position.

Fig. 4 which is a diagrammatic representation of the right hand side of the clutch shown in Figs. 1 and 2 illustrates clearly the method and means by which the quantity of oil supplied to or contained in the clutch can be adjusted and determined according to this invention. In order to adjust or to determine the quantity of oil in the clutch the driven member 11 of the clutch is turned into position to present the two holes 25 for the supply of oil at the same level and the plugs or set screws 26 are withdrawn to leave open the holes 25. The driven member 11 is then turned to present the holes 25 at appropriate different levels as is indicated for example by the several dotted representations and by observing whether the oil appears at or issues from the hole 25 which is lower in any position of the driven member, it is easy to ascertain what is the depth of the oil in the lower part of the clutch and to add or to remove oil as may be requisite in order that the clutch may contain the quantity of oil desirable.

The clutches shown in Figs. 1 and 2 and Fig. 3 can be filled with oil up to the level of the lowest parts of the inner circumferences of the packings 40 and 50 respectively.

If in any case adjustment of the quantity of oil in a clutch does not suffice to effect the requisite adjustment of speed at which the driving and driven parts of the clutch are to become engaged further variation may be effected by adjustment of the quantity and also by change of oil or other lubricant or mixture of oils or other lubricants of different viscosities or alternatively simply by change of one lubricant for another of different viscosity.

In each of the clutches shown as examples in the drawings the driving members are in the form of four radially movable blocks and the driving and driven members have each a plurality of symmetrical ridges and grooves. The invention however is applicable with single or any number of driving members in each clutch. A ridge and a groove to receive it may be of V shape or any other shape enabling the ridge to grip or to bear firmly against the sides of the groove in which it is received and may be symmetrical or of different inclinations or forms at opposite sides and the bounding faces may be straight or stepped or curved in their radial section.

Provision for the drainage or expulsion of lubricant from between the engaging surfaces of the driving and driven members of a centrifugal friction clutch according to this invention, when the driving and driven members are revolving in engagement, may be made in different ways in different cases as by means of grooves in the driven member or other space or spaces into which lubricant may be carried by centrifugal action.

The engaging surfaces of clutches provided according to this invention may be of cast iron or of brass, copper, phosphor bronze, fibre, wood, anti-friction metals and fabrics and materials such as are used for brakes and usually made from asbestos and the like or may be made of any other materials appropriate.

Centrifugal friction clutches provided according to this invention are applicable for any purposes for which centrifugal friction clutches are requisite and especially for driving machinery, particularly spinning and weaving machinery receiving motion from electric motors, turbines and internal combustion motors needing to be in motion at some speed before motion can be transmitted from them.

In using oil or other lubricant in greater or less quantity according to this invention as the means of determining or adjusting the speed at which the driving member or members of a centrifugal friction clutch shall pass into engagement with the driven member of the clutch more or less oil or other lubricant is introduced into the clutch according as the driving member or members is or are to pass into engagement with the driven member or members at a higher or a lower speed of revolution or a higher or a lower percentage of the ordinary speed of revolution for which the clutch is intended.

By means of the use of more or less lubricant according to this invention it is made easy to adjust a centrifugal clutch so that the driving member or members shall pass into engagement with the driven member or members at speeds of revolution equal to from 90 (ninety) per cent or upwards down to 50 (fifty) per cent or less of the speed at which the clutch is intended ordinarily to be revolved.

The adjustment of the speed of engagement of a clutch of the driving and driven parts of a centrifugal clutch by changing the quantity of oil or other lubricant or change of the oil or other lubricant as well as change of the quantity or simply change of oil or other lubricant may be employed in centrifugal friction clutches of constructions other than those herein described as provided according to this invention.

What I do claim as my invention and desire to secure by Letters Patent is:—

1. A centrifugal clutch comprising a revoluble driven member which presenting means for retaining lubricant in the lower parts of the interior of the driven member when at rest and presenting inwardly an engaging surface with a plurality of grooves and ridges having oppositely inclined sides for co-operating with the engaging surface of a driving member and also presenting space into which lubricant may be driven from the engaging surface by revolution of the driven member presents a passage formed to extend therefrom parallel to the axis of said driven member and communicating with all said grooves, a filling opening in line with said passage, said passage and opening being presentable at different levels by the driven member being turned into different positions around its axis of revolution, means for closing said opening, a driving member presenting an outwardly directed converse engaging surface with a plurality of converse ridges and grooves having oppositely inclined sides for co-operation with the engaging surface of the driven member and movable inwardly and outwardly relatively to the axis of revolution of the clutch and driven member and movable outwardly by the centrifugal force due to its revolution into engagement with the driven member and means for revolving and guiding said driving member.

2. A centrifugal clutch comprising a revoluble driven member which presenting means for retaining lubricant in the lower parts of the interior of the driven member when at rest and presenting inwardly an engaging surface with a plurality of grooves and ridges having oppositely inclined sides for co-operating with the engaging surfaces of driving members and also presenting space into which lubricant may be driven from the engaging surface by revolution of the driven member, presents a passage formed to extend therefrom parallel to the axis of said driven member and communicating with all said grooves, a filling opening in line with said passage, said passage and opening being presentable at different levels by the driven member being turned into different positions around its axis of revolution, means for closing said opening, driving members each presenting an outwardly directed converse engaging surface with a plurality of converse ridges and grooves having oppositely inclined sides for co-operation with the engaging surface of the driven member and movable inwardly and outwardly relatively to the axis of revolution of the clutch and driven member and movable outwardly by the centrifugal force due to their revolution into engagement with the driven member and means for revolving and guiding said driving members.

3. A centrifugal clutch comprising a revoluble driven member which presenting means for retaining lubricant in the lower parts of the interior of the driven member when at rest and presenting inwardly an engaging surface with a plurality of grooves and ridges having oppositely inclined sides for co-operating with the engaging surface of a driving member and also presenting space into which lubricant may be driven from the engaging surface by revolution of the driven member presents a passage formed to extend therefrom parallel to the axis of said driven member and communicating with all said grooves, a filling opening in line with said passage, said passage and opening being presentable at different levels by the driven member being turned into different positions around its axis of revolution, means for closing said opening a driving member presenting an outwardly directed converse engaging surface with a plurality of converse ridges and grooves having oppositely inclined sides for co-operation with the engaging surface of the driven member and movable inwardly and outwardly relatively to the axis of revolution of the clutch and driven member and movable outwardly by the centrifugal force due to its revolution into engagement with the driven member, means for revolving and guiding said driving member and means consisting in the provision of lubricant in greater or less quantity, for determining that the driving member shall cease to slip in the driven member at a higher or a lower speed of revolution in being brought into engagement with the said driven member.

4. A centrifugal clutch comprising a revoluble driven member which presenting means for retaining lubricant in the lower parts of the interior of the driven member when at rest and presenting inwardly an engaging surface with a plurality of grooves and ridges having oppositely inclined sides for co-operating with the engaging surfaces of driving members and also presenting space into which lubricant may be driven from the engaging surface by revolution of the driven member, presents a passage formed to extend therefrom parallel to the axis of said driven member and communicating with all said grooves, a filling opening in line with said passage, said passage and opening being presentable at different levels by the driven member being turned into different positions around its axis of revolution, means for closing said opening, driving members each presenting an outwardly directed converse engaging surface with a plurality of converse ridges and grooves having oppositely inclined sides for co-operation with the engaging surface of the driven member and movable inwardly and outwardly relatively to the axis of revolution of the clutch and driven member and movable outwardly by the centrifugal force due to their revolution into engagement with the driven member, means for revolving and guiding said driving members and means consisting in the provision of lubricant in greater or less quantity, for determining that the driving members shall cease to slip in the driven member at a higher or a lower speed of revolution in being brought into engagement with the said driven member.

In testimony, that I claim the foregoing as my invention, I have signed my name this nineteenth day of March, 1925.

WILLIAM WALLACE.